Aug. 27, 1957  G. H. FRY, JR  2,803,887
LONG PERIOD PENDULUM FOR NAVIGATION CONTROL SYSTEM
Filed Sept. 22, 1953
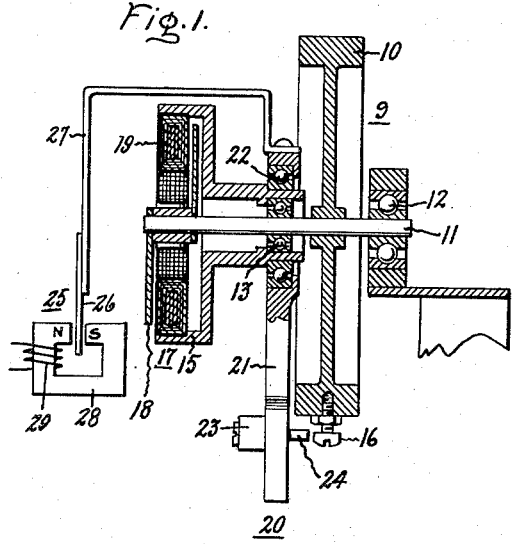
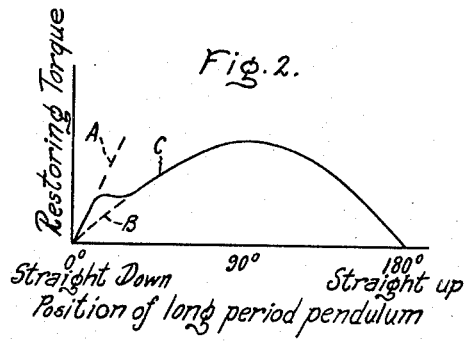
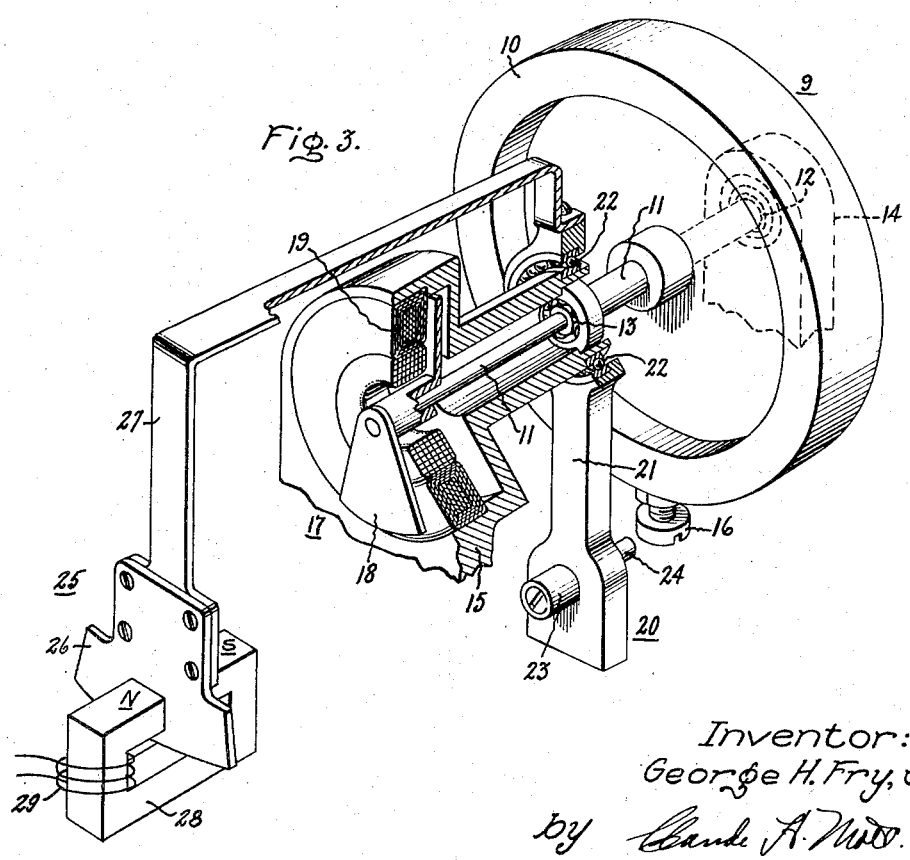
Inventor:
George H. Fry, Jr.,
by
Their Attorney

United States Patent Office 2,803,887
Patented Aug. 27, 1957

2,803,887

LONG PERIOD PENDULUM FOR NAVIGATION CONTROL SYSTEM

George H. Fry, Jr., Schenectady, N. Y., assignor to General Electric Company, a corporation of New York Application September 22, 1953, Serial No. 381,528

14 Claims. (Cl. 33—215)

This invention generally relates to an attitude sensing device, and more particularly to a compensated pendulum for determining the angular position of a movable body referenced to true vertical.

Vertical reference devices or devices that provide an indication of true vertical despite varying movements of their supporting member are widely employed in many applications including the automatic control of navigable craft. In such applications the attitude of the craft with respect to one or more of its axes may be continuously measured by determining the craft's angular position relative to the established vertical, and thereafter this information may be employed either manually or automatically to control the attitude of the craft about the selected axis.

Many differing devices have heretofore been employed to provide such a vertical reference, but the most widely used devices of this type have been the vertical gyroscope and the pendulum.

Gyroscopes, however, as heretofore known in the art, are subject to drift. Therefore, to insure that the axes of these gyros continuously attain a predetermined position with reference to the earth over relatively long periods of time without drift has necessitated that these gyros be supplied with drift compensating equipment. Furthermore, gyros must be additionally caged and uncaged at the initial zero angle with respect to the horizon, for otherwise a false vertical reference position may be established despite the action of the compensating means. Consequently, gyroscopes with their compensating equipment and caging equipment are complicated, delicate, and expensive instruments.

Pendulums, on the other hand, are generally rather simple gravity seeking or vertical reference devices comprised of a mass supported from pivotal knife edges or the like which is free to oscillate relative to its support and therefore in the absence of forces acting thereon, assume a true vertical path pointing to the earth's center of gravity. However, being free to oscillate, simple pendulums are affected by acceleration or deceleration of their supporting member, thereby assuming an apparent vertical position displaced from true vertical in response to such motions and introducing a variable error in the control system. Heretofore, attempts have been made to reduce this acceleration error by designing large and heavy pendulums having a moment of inertia close to the pivotal support, i. e., long period pendulums. However, such devices have been generally unsatisfactory and have resulted in additional errors. One such additional error that serves to limit the design of long period pendulums for these purposes is resonance, which occurs when the natural frequency of oscillation of the pendulum approaches the natural frequency of the over-all control system. Another error resulting from the design of massive pendulums having a center of gravity proximate the pivotal axis is the occurrence of dead space, which may be defined as small angular displacements of the pendulum from true vertical in which the frictional forces of the knife edges or supports are greater than the gravity seeking restoring force of the pendulum thereby preventing the pendulum from returning to vertical. Thus, in designing a simple pendulum a conflict occurs between the various errors due to acceleration and deceleration, and the errors caused by resonance and dead space, which conflict effectively prevents the successful and accurate employment of simple pendulums for these purposes.

Because of these inaccuracies inherently associated with simple pendulums, various compensating means have been heretofore proposed to minimize the effect of acceleration and maintain the pendulum at true vertical. Among such devices may be classified the dampers, and acceleration feed-back devices. However, damping the movement of the pendulum with respect to the rapid accelerations of the supporting body also introduces "time lags" in the pendulum response to attitude deviation of the supporting body from true vertical, thereby lessening the sensitivity of the system to such attitude deviations. Correspondingly, feed-back devices to correct for pendulum errors due to acceleration and deceleration of the supporting body have also been considered unsatisfactory, for such feed-back systems embody additional servo mechanisms and acceleration measuring devices greatly increasing the cost and complexity of the over-all pendular device.

To provide a true vertical reference which is both less complex and less expensive than the vertical gyros and conventionally constructed compensated pendulums, while preserving the simplicity and rapid response of the simple pendulum, the present invention is primarily directed.

In accordance with one embodiment of the invention, a compensated pendulum is provided which is actually constituted of two pendulums, a long period pendulum and a short period pendulum. The long period pendulum is, of course, relatively insensitive to acceleration and continuously indicates true vertical despite such acceleration, but as discussed above is subject to dead spaces. The short period pendulum, on the other hand, has a large restoring torque and is therefore not subject to dead spaces, but is, of course, sensitive to accelerational forces. A novel magnetic coupling means is provided to intermittently interconnect these pendulums, whereby utilizing the long period pendulum to establish a true vertical despite acceleration and deceleration of the supporting body, and the short period pendulum to correct the vertical position of the long period pendulum for dead spaces, the present invention provides a resultant pendular vertical reference which accurately maintains the true vertical despite such acceleratory or deceleratory motions of its support. This magnetic coupling means interconnecting these two pendulums operates to effectively enable the unhampered suspension of the long period pendulum despite oscillatory movement of the short period pendulum in response to acceleratory forces, while providing close coupling of these members for small dead space rotation of the long period pendulum to accurately correct therefor as will be more fully comprehended hereinafter.

It is accordingly one object of the invention to provide a vertical reference which is insensitive to acceleration or deceleration of its supporting body.

Another object of this invention is to provide a reference device stabilized to continually indicate true vertical over long periods of time without initial adjustment or subsequent maintenance.

Another object of this invention is to provide a means for eliminating pendulum dead space.

A still further object of this invention is to provide an accurate vertical reference device which is simpler, less expensive, and requires less adjustment and maintenance than prior devices.

Other objects and many attendant advantages of the invention will be more readily comprehended upon a detail consideration of the following detail description of one preferred embodiment of the invention, taken in connection with the following drawings wherein:

Fig. 1 is a simplified cross-sectional view generally illustrating one embodiment of the invention;

Fig. 2 is a graph for schematically illustrating the operation of this embodiment; and Fig. 3 is a perspective view, partly in section, illustrating the detailed arrangement of this proposed embodiment of the invention.

Referring now to Figs. 1 and 2 for a general consideration of one proposed embodiment of the invention and the manner of its operation, a long period pendulum 9, which may be comprised of a balanced or slightly unbalanced flywheel 10, is fixedly mounted on a shaft 11 rotatably supported from support members 14 and 15 by suitable means such as bearings 12 and 13. Pendulum 9 and shaft 11 are therefore free to integrally rotate with respect to bearing supports 14 and 15 which may be permanently affixed to a vehicle (not shown) or other movable and maneuverable body. Flywheel 10, being slightly unbalanced by means of a small added weight which may comprise a screw 16 threaded to a portion of the periphery thereof, functions as a pendulum, and the gravity seeking unbalance thereof motivates shaft 11 to rotate with respect to bearing supports 14 and 15 until a substantially true vertical position is indicated by the vertical seeking position of screw 16. Should the vehicle or other supporting member then vary its angular position with respect to true vertical, pendulum 9 maintains this vertical indicating position in space by enabling supporting members 14 and 15 to rotate with respect thereto, and thus in theory continuously enables the angular difference between vehicle supports 14 and 15 and pendulum 9 (shaft 11) to serve as a measurement of the vehicles angular deviation from true vertical.

To convert this measurable angular deflection of the vehicle from true vertical to an electrical quantity suitable for indication or control purposes, a frictionless electrical pick-off may be employed, such as the Z type pick-off 17, as shown. Pick-off 17, comprises a rotor member 18 coupled for movement with pendulum shaft 11, and a stator member 19, electro-magnetically associated therewith and connected to pendulum support 15; relative rotative displacement of these members from a null position providing an electrical output proportional to the difference between the angular position of the pendulum shaft and the supporting body, which difference is in turn proportional to the deviation of the supporting body or vehicle from true vertical. A more detailed description of this preferred frictionless pick-off may be found in Patent No. 1,431,627 issued to William H. Bristol on October 10, 1922.

What has been generally described thus far, constitutes in essence a somewhat conventional simple pendulum type vertical measuring device. However, in considering the operation of the simple pendulum, it is assumed that due to the pendulum mass unbalance, a restoring force continuously compels the simple pendulum 9 to seek the true vertical despite movements of its supporting members or the maneuvers of the vehicle housing the same. In practice, however, this assumption has been found to be inaccurate, for the simple pendulum being free to oscillate with respect to its supporting axis in response to movements of this supporting body may not continuously return to a position indicating true vertical, but on the contrary may either assume an apparent vertical position displaced from true vertical or alternatively may intermittently oscillate about its axis so frequently as to supply a varying vertical reference indication, thereby introducing a variable error in the measurement. For example, if the simple pendulum is designed to provide a large restoring force compelling an accurate indication of true vertical (i. e., a short period pendulum) it is provided with a large moment arm and has a center of mass remotely positioned from its axis of rotation. Under these conditions the pendulum restoring force being large with respect to the frictional forces of the supporting knife edges accurately returns the pendulous mass to a true vertical seeking position in the absence of acceleratory movement of its supporting member. However, should the supporting member accelerate or decelerate, the remotely positioned pendulous mass, being subject to inertia and being freely displaceable with respect to its support, is deflected to assume an error angle with respect to true vertical. Furthermore, if such acceleratory movements of the support are rapid and erratic, the short period pendulum being highly sensitive thereto may be maintained in a varying oscillatory state for long periods of time.

Conversely, should this simple pendulum be designed to have a long period of oscillation and therefore be relatively insensitive to rapid acceleratory motions of its support, a correspondingly small restoring force attempts to maintain a true vertical. Under this condition, the pendulum is subject to "dead spaces" or more descriptively, small angles of rotation in which the restoring force is insufficient to overcome the friction provided by the rotatable pivot members, thereby failing to return the pendulous mass to a position indicating true vertical.

Pendulum 9, comprising a massive, slightly unbalanced flywheel 10, constitutes a long period pendulum of this latter type and therefore is relatively insensitive to acceleratory motions of supporting member 14 and 15 and of the vehicle or other body housing the same, while correspondingly being subject to dead spaces. To therefore compensate for this susceptibility to dead spaces which are thus inherently associated with such long period pendulums and thereby provide a resultant pendular reference which is both insensitive to acceleratory motions of the support and in addition has a sufficient restoring force to accurately return the pendulus mass to a true vertical indicating position, a second correcting pendulum, generally designated 20, is provided.

Correcting pendulum 20, on the other hand, is preferably comprised of an elongate moment arm 21, pivotally mounted at one end thereof by bearings 22 to rotate with respect to support 15, and having an unbalanced mass 23 annexed to the freely swinging opposite end thereof. Due to the relatively long moment arm 21 intermediate the pivot point and the mass, pendulum 20 has a large restoring torque for exerting a vertical seeking force far in excess of the friction provided by its bearings 22. Consequently, as discussed above, pendulum 20 is highly sensitive to acceleration or deceleration of support 15 and is therefore prone to assuming an apparent vertical position displaced from true vertical during acceleratory movement of support 15, and is additionally prone to oscillatory movement about its support during changes in such acceleratory movement.

As shown, short period pendulum 20 and long period pendulum 9 are each mounted to rotate about a coincident axis defined by the longitudinal axis of shaft 11. However, although these members are supported closely together, they are physically separated, and in the absence of additional coupling members interconnecting these members, each is free to independently move about the axis defined by shaft 11.

For interconnecting these members to enable the short period pendulum to correct for "dead space" or drift of the long period pendulum, a magnetic coupling member generally designated 24 may be annexed to the freely swinging end of pendulum 20. As shown, this coupling member preferably comprises a permanently magnetized, elongate, rod shaped magnet 24 extending at approximately right angles to both the moment arm 21 of short period pendulum 20 and that of long period pendulum 9, and positioned proximate to unbalancing screw 16 of pendulum 9 to exert an attractive force thereon. With the two pendulums substantially indicating true vertical position or slightly deviating therefrom, a magnetic coupling exists therebetween tending to pull them together; whereas should these pendulums be displaced at larger angles from each other, the magnetic force therebetween is substantially negligible and each pendulum being substantially independent of the other performs as a freely suspended body. Consequently, should the long period pendulum 9 drift, or otherwise fail to return to substantially true vertical after being disturbed therefrom, short period pendulum effectively coupled thereto for this slight drift compels the correction of this drift error by magnetically attracting unbalancing screw 16. However during periods of acceleration, short period pendulum 20, being more sensitive thereto, is rapidly displaced from true vertical and therefore effectively disconnected from magnetic engagement with long period pendulum 9. During this acceleration, long period pendulum, being relatively insensitive thereto, continues to indicate true vertical position unhampered by the rapid deflection or oscillation of short period pendulum 20.

Referring now to Fig. 2 for a graphic illustration of this operation wherein the vertical restoring torques of each pendulum is plotted against the angular deflection of the pendulum from true vertical, it is observed that curve A, representing in dotted lines the individual characteristic of the short period pendulum 20, linearly increases its vertical seeking force as it is displaced from true vertical. Curve B, however, representing in dotted lines the individual characteristic of long period pendulum 9, follows a substantially sinusoidal variation in vertical seeking force with deflection, and therefore for small deflections provides a much lower restoring force than does short period pendulum 20. Curve C, therefore, illustrating by a solid line the resulting characteristic of the long period pendulum as corrected by the short period pendulum, clearly portrays the advantages of this correction; since for small deflections the long period pendulum is endowed with the large restoring force of the short period pendulum, and for larger deflections it is substantially independent thereof.

Fig. 3 illustrates in greater detail this preferred embodiment of the invention wherein the similarly numbered parts schematically illustrated by Fig. 1 are more completely and descriptively represented in relation to the cutaway portions of the supporting members 14 and 15. If desired, a damping means, such as the eddy current damper generally designated 25, may be additionally supplied to prevent excessive movement and oscillation of the short period pendulum 20. As shown, this damper may comprise a paddle or damping vane member 26 affixed at one end thereof through the medium of a conveniently convoluted elongate arm 27, to the upper extended end of short period pendulum 20. This damping vane member therefore being movable, with similar movement of pendulum 20, through the magnetic field of a substantially U-shaped magnet 28, to restrain rapid movements of pendulum 20. The damping forces may, of course, be varied by controlling this magnetic field through electromagnet coil 29 or the damping held constant by employing a permanent magnet, if desired. Clearly in this connection many differing damping means may be provided as is well known in the art.

Consequently, this invention effectively provides a sensitive hybrid pendular vertical reference device embodying the characteristic of being both substantially insensitive to acceleratory motions of the supporting member in addition to being free from drift and dead space errors. This hybrid pendulum reference device thereby combining the advantageous features formerly found individually only in two differing varieties of simple pendulums, the long period pendulum and the short period pendulum, while effectively eliminating the disadvantages heretofore associated with each said member.

Inasmuch as many variations to the specific structure illustrated and described may be readily made by those skilled in the art in accordance with the basic invention herein disclosed without departing from the spirit and scope of the invention, this invention is to be considered as limited only in accordance with the features thereof as set forth in the claims appended hereto.

What I claim as new and desire to secure by Letters Patent of the United States is:

1. In a substantially true vertical reference a support, a long and short period pendulum pivotally retained thereby for freedom about one axis, and magnetic means for coupling these pendulums to thereby correct for small dead space deviations of said long period pendulum relative to true vertical.

2. In a substantially true vertical reference a support, a long and a short period pendulum pivotally retained thereby, and magnetic means associated with said short period pendulum for attracting said long period pendulum to correct for small rotative deviations therebetween.

3. In a device for stabilizing an object, an unbalanced flywheel pivotally supported by said object, a short period pendulum pivotally supported by said object with respect to the same rotative axis, and magnetic coupling means associated with said short period pendulum for attracting said flywheel to correct for small relative deflections thereof and effecting alignment therebetween at substantially true vertical position.

4. In a substantially true vertical reference a support, an unbalanced flywheel pivotally associated therewith, a short period pendulum pivotally associated therewith with respect to the same rotative axis, and magnetic coupling means associating said short period pendulum and flywheel to effect alignment thereof by correcting for small relative deflections therebetween while unaffecting either member for greater relative reflections.

5. In a device for stabilizing an object a long period pendulum pivotally supported thereby for freedom about at least one axis, a short period pendulum pivotally retained thereby for freedom about said axis, and magnetic means associated with said short period pendulum and coupling said long and short period pendulums to correct for small deviations therebetween while enabling independent freely suspended motion of each member for larger deviations therebetween.

6. In an instrument for determining substantially true vertical position, a support, a long period pendulum pivotally retained thereby for freedom about one axis, and a short period pendulum pivotally retained thereby for freedom about said axis, and magnetic means coupling said pendulums for bringing said pendulums into coincident positions for small relative deviations therebetween while enabling their freely suspended motion for larger deviations therebetween, said magnetic means including a magnetic member supported by said short period pendulum and attracting said long period pendulum when these members are in substantial alignment or slightly deviating therefrom, while effectively being decoupled therefrom for larger relative deviations between said members.

7. In a device for determining substantially true vertical position, a movable support, a first vertical seeking freely suspended member pivotally supported thereby, said first member adapted to indicate substantially true vertical position despite acceleratory movement of said body transverse to the axis of said pivotal support, a second vertical seeking freely suspended body, said second body being pivotally supported about said axis and having a large vertically seeking force, and magnetic means associated with said second member and coupling said first and second members to effect alignment therebetween for small relative rotative displacements.

8. In a substantially true vertical reference, a support, a long and a short period pendulum pivotally retained thereby, and intermittent coupling means associated with said short period pendulum for coupling said pendulums into alignment for small space deviations therebetween and for decoupling said pendulums permitting free suspension thereof for greater space deviations therebetween.

9. In a device for stabilizing an object, a pendulum pivotally supported by said object, a second pendulum pivotally supported by said object, said first pendulum having a long period of oscillation and thereby being relatively insensitive to acceleration and deceleration of said object, and said second pendulum having a large restoring torque to accurately maintain true vertical in the absence of acceleratory movements of said object, and intermittent coupling means interconnecting said first and second pendulums for small space deviations therebetween and disconnecting said first and second pendulums to enable free suspension thereof for greater space deviations therebetween.

10. In a device for stabilizing an object, a first pendulum pivotally supported thereby, said first pendulum being relatively insensitive to acceleratory movement of said object for changing its vertical indicating position, a second pendulum pivotally supported by said object and in proximity to said first pendulum, said second pendulum having a large vertical restoring torque in excess of the pivotally exerted friction, and intermittent coupling means associating said first and second pendulums and operative to effect alignment therebetween for small space deviations thereof and disassociating said pendulums for larger space deviations therebetween to enable freely suspended movement thereof.

11. In a device for stabilizing an object a slightly unbalanced flywheel pendulum pivotally supported thereby, a second pendulum pivotally supported by said object in proximity to said first pendulum, said second pendulum having a large vertical restoring torque in excess of the friction provided by its pivotal support, and intermittent coupling means associating said pendulums and operative to effect alignment therebetween for small relative deviations therebetween, and operative to decouple said pendulums for greater relative deviation therebetween to enable independent freely suspended movements thereof.

12. In a device for determining substantially true vertical position, a movable support, a first vertically seeking freely suspended member pivotally supported thereby, said first member adapted to indicate substantially true vertical position despite acceleratory movement of said support, a second vertical seeking freely suspended member, said second member being pivotally suspended about said support and having a large vertically seeking force, and intermittent coupling means associated with said second member and coupling said first and second members to effect alignment therebetween for small relative rotative displacements and decoupling said first and second members to enable freely suspended movements thereof for greater relative rotative displacements 13. In a substantially true vertical reference a support, a long period pendulum and a short period pendulum pivotally retained by said support for freedom about one axis, and magnetic means for intermittently coupling said long and said short period pendulums together, said short period pendulum being provided with damping means, said damping means comprising a damping vane attached to one end of said short period pendulum and being movable through a magnetic field.

14. In a device for determining substantially true vertical position, a movable support, a first vertical seeking, freely suspended member pivotally supported from said support, said first member having a relatively long period, a second vertical seeking, freely suspended member, being pivotally suspended from said support, said second member having a large vertical seeking force, said second member being provided with a damping means in the form of a vane, attached to one end of said second member and being movable through a magnetic field, and intermittent coupling means associated with said first and second vertical seeking members to affect alignment therebetween to correct for small relative rotative displacements.

References Cited in the file of this patent

UNITED STATES PATENTS

| 982,336 | Wimperis | Jan. 24, 1911 |
| 2,108,695 | Tapley | Feb. 15, 1938 |
| 2,366,995 | Aulin | Jan. 9, 1945 |
| 2,508,961 | McNerney | May 23, 1950 |
| 2,611,973 | Carter | Sept. 30, 1952 |

FOREIGN PATENTS

| 458,474 | Great Britain | Dec. 21, 1936 |